July 5, 1927.
E. F. CARTER
CONTROL APPARATUS
Filed Nov. 10, 1925
1,634,979
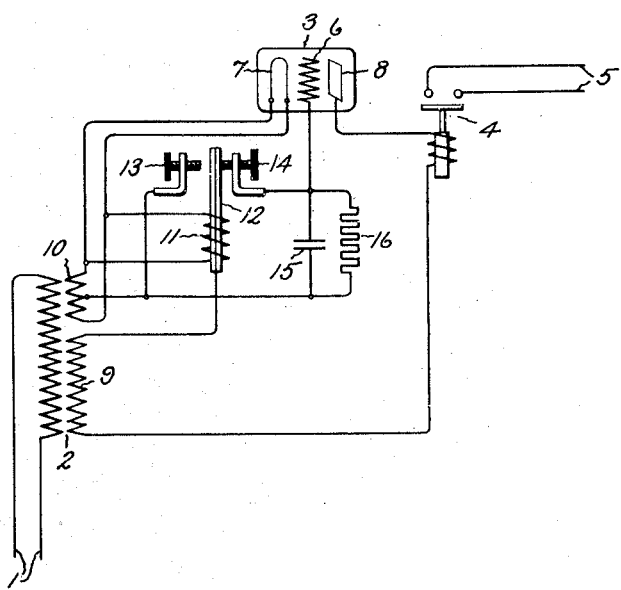
Inventor:
Emmett F. Carter,
by
His Attorney.

Patented July 5, 1927.

1,634,979

UNITED STATES PATENT OFFICE.

EMMETT F. CARTER, OF SCHENECTADY, NEW YORK, ASSIGNOR TO GENERAL ELECTRIC COMPANY, A CORPORATION OF NEW YORK.

CONTROL APPARATUS.

Application filed November 10, 1925. Serial No. 68,243.

My invention relates to control apparatus, and has for its principal object the provision of an improved control apparatus wherein an electroresponsive device supplied with current through an electric valve is operated with a predetermined time delay by current supplied from a single source.

It has been proposed to predetermine the time delay in the operation of an electroresponsive device by the charge or discharge rate of a condenser connected in the grid circuit of an electrical valve through which current is supplied to the device. This method of operation involves the use of different sources for supplying current to the cathode heating, grid and anode circuits of the valve. It is desirable that all the current utilized in the operation of the apparatus be supplied from a single source. In the illustrated embodiment of my invention, this result is produced by means comprising an element operable in response to energization of the apparatus successively to cause charging of the grid circuit condenser and connection of the device to be operated in the anode circuit of the valve.

My invention will be better understood from the following description when considered in connection with the accompanying drawing and its scope will be pointed out in the appended claims.

Referring to the drawing, the single figure thereof shows an apparatus wherein a thermal element is utilized to control the change in the anode circuit connections of an electrical valve through which current is supplied to the circuit to be operated.

The figure shows a circuit 1 for transmitting current from a suitable source through a transformer 2 and an electric valve 3 to an electroresponsive device, shown as a relay 4 adapted to control the connections of a circuit 5. The valve 3 comprises a grid 6 for controlling the transmission of current between its cathode 7 and its anode 8 to the operating coil of the relay 4. The transformer 2 is provided with secondary circuit 9 for supplying current to the anode circuit of the valve 3 and a secondary circuit 10 for supplying heating current to the cathode 7 and to the coil 11 which controls the temperature of a thermostatic element 12 and is adapted to be operated between contact members 13 and 14 in response to change in its temperature. It should be noted that the terminals 13 and 14 are connected to opposite terminals of a condenser 15 interposed in the grid circuit of the valve 3 and that impedance means, shown as a resistor 16, is connected to the condenser for allowing it to discharge at a predetermined rate. The condenser 15 and resistor 16 may thus be regarded as the time delay element of the apparatus.

The operation of the apparatus will be readily understood if it be assumed that the transformer 2 is connected to a source of alternating current. Under these conditions, heating current is supplied to the cathode 7 and to the coil 11. At the same time the condenser terminal connected to the grid is charged to a negative potential by current transmitted through the thermostatic element 12 and the anode circuit of the valve 3. This current, however, is of insufficient magnitude to operate the relay 4. Due to the current of the coil 11, the thermostatic element 12 is moved out of engagement with the contact member 14 and into engagement with the contact member 13, thus disconnecting the condenser 15 from the winding 9 and connecting this winding to the cathode 7. When this occurs the grid 6 is charged to a negative potential which precludes the transmission of sufficient current through the valve 6 to operate the relay 4. As the charge of the condenser 15 leaks off through the resistor 16, however, the current transmitted through the valve 3 increases until it eventually attains a value at which operation of the relay is produced. The time required to produce this operation is dependent on the capacity of the condenser and the resistance of the resistor. The thermostatic element is preferably designed to maintain engagement with the contact member 14 just long enough to ensure charging of the condenser.

The embodiment of the invention illustrated and described herein has been selected for the purpose of clearly setting forth the principles involved. It will be apparent however that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of an electrical valve comprising a grip for controlling the transmission of current between its cathode and anode, current supply means comprising circuits for transmitting heating current to said cathode and for transmitting current between said cathode and anode, a time delay device connected between said grid and cathode, and means operable in response to energization of said supply means successively to connect said cathode to said anode through said device for storing energy in said device and to connect said cathode to said anode independently of said device through a circuit wherein the current increases at a rate dependent on the rate at which energy is dissipated from said device.

2. The combination of an electrical valve comprising a grid for controlling the transmission of current between its cathode and anode, current supply means comprising circuits for transmitting heating current to said cathode and for transmitting current between said cathode and anode, a time delay device connected between said grid and cathode, and thermal means operable in response to energization of one of said circuits successively to connect said cathode to said anode through said device for storing energy in said device and to connect said cathode to said anode independently of said device through a circuit wherein the current is dependent on the magnitude of the energy stored in said device.

3. The combination of an electrical valve comprising a grid for controlling the transmission of current between its cathode and anode, current supply means comprising circuits for transmitting heating current to said cathode and for transmitting current between said cathode and anode, a condenser connected between said cathode and grid, and means operable in response to energization of said cathode heating circuit successively to connect said cathode to said anode through said condenser for storing energy in said condenser and to connect said cathode to said anode independently of said condenser through a circuit wherein the current is determined by the charge of said condenser.

4. The combination of an electrical valve comprising a grid for controlling the transmission of current between its cathode and anode, current supply means comprising circuits for transmitting heating current to said cathode and for transmitting current between said cathode and anode, a condenser connected between said cathode and grid, means operable in response to energization of said cathode heating circuit successively to connect said cathode to said anode through said condenser for storing energy in said condenser and to connect said cathode to said anode independently of said condenser through a circuit wherein the current is determined by the charge of said condenser, and means connected to said condenser for predetermining the rate at which its charge is dissipated.

5. The combination of an electrical valve comprising a grid for controlling the transmission of current between its cathode and anode, current supply means comprising circuits for transmitting heating current to said cathode and for transmitting current between said cathode and anode, a condenser connected between said cathode and grid, means operable in response to energization of said cathode heating circuit successively to connect said cathode to said anode through said condenser for storing energy in said condenser and to connect said cathode to said anode independently of said condenser through a circuit wherein the current is determined by the charge of said condenser, and a resistor connected to the terminals of said condenser for causing it to be discharged at a predetermined rate.

6. The combination of a device to be operated, an electrical valve comprising a grid for controlling the transmission of current between its cathode and anode, a time delay element interposed between said cathode and anode, current supply means, and means operable in response to energization of said current supply means successively to cause energy to be stored in said time delay element and to cause said device to be operated after an interval of time determined by the rate at which energy is dissipated from said time delay element.

In witness whereof, I have hereunto set my hand this 9th day of November, 1925.

EMMETT F. CARTER.